US006339779B1

United States Patent
Houldsworth

(10) Patent No.: US 6,339,779 B1
(45) Date of Patent: Jan. 15, 2002

(54) REFERENCE COUNTING MECHANISM FOR GARBAGE COLLECTORS

(75) Inventor: Richard J. Houldsworth, Horley (GB)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/338,150

(22) Filed: Jun. 23, 1999

(30) Foreign Application Priority Data

Jun. 27, 1998 (GB) .............................................. 9813828

(51) Int. Cl.⁷ .............................................. G06F 17/30
(52) U.S. Cl. ..................................................... 707/206
(58) Field of Search .......................... 707/206; 711/103, 711/165, 171

(56) References Cited

U.S. PATENT DOCUMENTS

| | | | | |
|---|---|---|---|---|
| 5,784,699 A | * | 7/1998 | McMahon et al. | 711/171 |
| 6,047,295 A | * | 4/2000 | Endicott et al. | 707/206 |
| 6,055,612 A | * | 4/2000 | Spertus et al. | 711/165 |

OTHER PUBLICATIONS (IEEE publication, 1988) discloses reliable garbage collection in object oriented systems by Gupta et al., in Software and Appliations Confer. COMPSAC 88, pp. 324–328 (Oct. 1988).*

(IEEE publication, 2000) discloses scalable hardware–algorithm for mark–sweep garbage collection, in Euromicro Confer, 200, Proc., vol. 1, pp. 274–281, (Sep. 2000).*

"Garbage Collection: Algorithms for Automatic Dynamic Memory Management", by R. Jones et al, pp. 1–18.

* cited by examiner

Primary Examiner—Diane D. Mizrahi
(74) Attorney, Agent, or Firm—Peter Verdonk

(57) ABSTRACT

A method of garbage collection and data processing apparatus embodying the same. Within a heap memory, data objects are accessed via respective pointers carried by memory stacks; the memory is periodically swept to mark, for each object, a count of the number of extant pointers thereto from any source and, on detection that an object's count has reached zero, deleting that object. To permit concurrency of mark and sweep operations, a pair of reference count fields are maintained for each object: one holds an ongoing pointer count for the present mark operation and the other holds the value for the preceding one. At the conclusion of each mark operation, the mapping of counts into fields is reversed. An objects count is taken as zero, and the object deleted, when both counts are zero.

16 Claims, 2 Drawing Sheets

REFERENCE COUNTING MECHANISM FOR GARBAGE COLLECTORS

BACKGROUND OF THE INVENTION

The present invention relates to a method and apparatus for handling stored data and particularly, but not exclusively, to memory compaction and garbage collection procedures executing in real time in real or virtual memory space of a data processing apparatus.

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

One known technique for garbage collection is through reference counting: each stored data object contains a field holding a count of the number of other objects that reference it. An object with a reference count of zero is unreferenced by any other object and is hence available for deletion by the memory management system. When an object becomes referenced from another object, the count is incremented. When a reference to the object is known to be cleared, the count may decrement, and when the count is decremented to zero the object may be immediately deleted. The count will have an upper limit, at which the count may become fixed (i.e. no longer decrement), with further changes due to manipulations of references not being recorded and the object becoming permanently locked against deletion - even when it legitimately becomes garbage.

A refinement to the above is a regenerative reference count system which uses a mark-sweep algorithm to mark all referenced objects in the heap. Before the mark stage, all object counts are zero. Each time an object is reached by the marking process, the count is incremented. With the reset to zero for each sweep, the problems encountered at upper limits for the count are no longer a permanent issue and can be recovered from. However, both variations require interruption to the system following marking whilst the objects with reference counts of zero are deleted or reclaimed. An improvement in terms of system performance comes from pipelining the marking and sweeping/deletion operations such as to greatly reduce the time that the system operation must be halted for sweeping of the heap. However, because a reference count must be constructed by the mark process before it can be used by the sweeper, this approach is incompatible with a reference count determination as to whether or not an object can be deleted.

SUMMARY OF THE INVENTION

It is therefore an object of the present invention to provide a garbage collection mechanism which provides the benefits of a regenerative reference counting mechanism whilst having also the benefits of a concurrent mark- sweep arrangement.

In accordance with the present invention there is provided a method of garbage collection for use in data processing apparatus wherein the memory contains a plurality of data objects, each said data object being at a respective known location within the memory and being accessed via respective pointers carried by memory stacks, the method comprising periodically traversing the memory to mark, for each object, a count of the number of extant pointers thereto from any source and, on detection that an object's count has reached zero, deleting that object; characterised in that the operations of marking and of deleting objects proceed concurrently and, for each object, separate counts are maintained during a traversal of the number of pointers detected during the ongoing mark traversal and the total number of pointers detected during the previous mark traversal, wherein an object is not deleted if either count holds a non-zero value. By maintaining the recorded count from a preceding traversal, and bringing this into the decision as to whether or not an object may be deleted, concurrency of marking and sweeping becomes possible, as will be described in greater detail with reference to embodiments of the invention hereinafter.

Suitably, each data object maintains a pair of fields into one of which the number of pointers detected during the ongoing mark traversal is written and into the other of which the total number of pointers detected during the previous mark traversal is written, with the mapping of values for the number of pointers detected during the ongoing mark traversal suitably being alternated between fields following each traversal. Alternating the mapping simplifies matters as it is not necessary to move the stored pointers data for every object.

In addition to the reference counts, each object preferably further maintains a mark state indicator identifying, for that data object, whether it has been checked during mark traversal and, if so, whether any pointers to the object have been detected. Such a mark state indicator may alternatively indicate whether the data object is available for deletion by a sweep utility periodically traversing the memory, such an indication overriding the effects of any count value settings. This feature would allow the instant deletion of those objects identified as deletable, without the need for one or two mark traversals to occur to reduce the stored reference counts to zero. In operation, detection at any time of the establishment of a new pointer to an object causes the stored total for pointers detected during a previous sweep to be increased by one, whereas detection of the removal of an existing pointer to an object causes the stored total for pointers detected during a previous sweep to be reduced by one, and the object to be marked available for (immediate) deletion if said stored total drops to zero.

Also in accordance with the present invention there is provided a data processing apparatus comprising a processor coupled with a random access memory containing a plurality of stored data objects, each said data object being at a respective known location within the memory and being accessed via respective pointers carried by memory stacks, the processor being configured to periodically sweep the memory and to mark in memory, for each object, a count of the number of extant pointers thereto from any source, and to detect when an object's count has reached zero, and delete that object; characterised in that the processor is configured to implement the operations of marking and of deleting objects concurrently and, for each object, to maintain in respective storage areas separate counts during a sweep of the number of pointers detected during the ongoing mark traversal and the total number of pointers detected during the previous mark traversal, wherein an objects count is taken by the processor as zero when both present and preceding sweep counts are zero. As above, the processors' writing of values for the number of pointers detected during the ongoing mark traversal is preferably alternated between the said respective storage areas (data fields for is the respective counts) following each traversal.

BRIEF DESCRIPTION OF THE DRAWINGS

The invention will now be described by way of example only, with reference to the accompanying drawings, in which.

DESCRIPTION OF THE PREFERRED EMBODIMENTS

Figure 1:
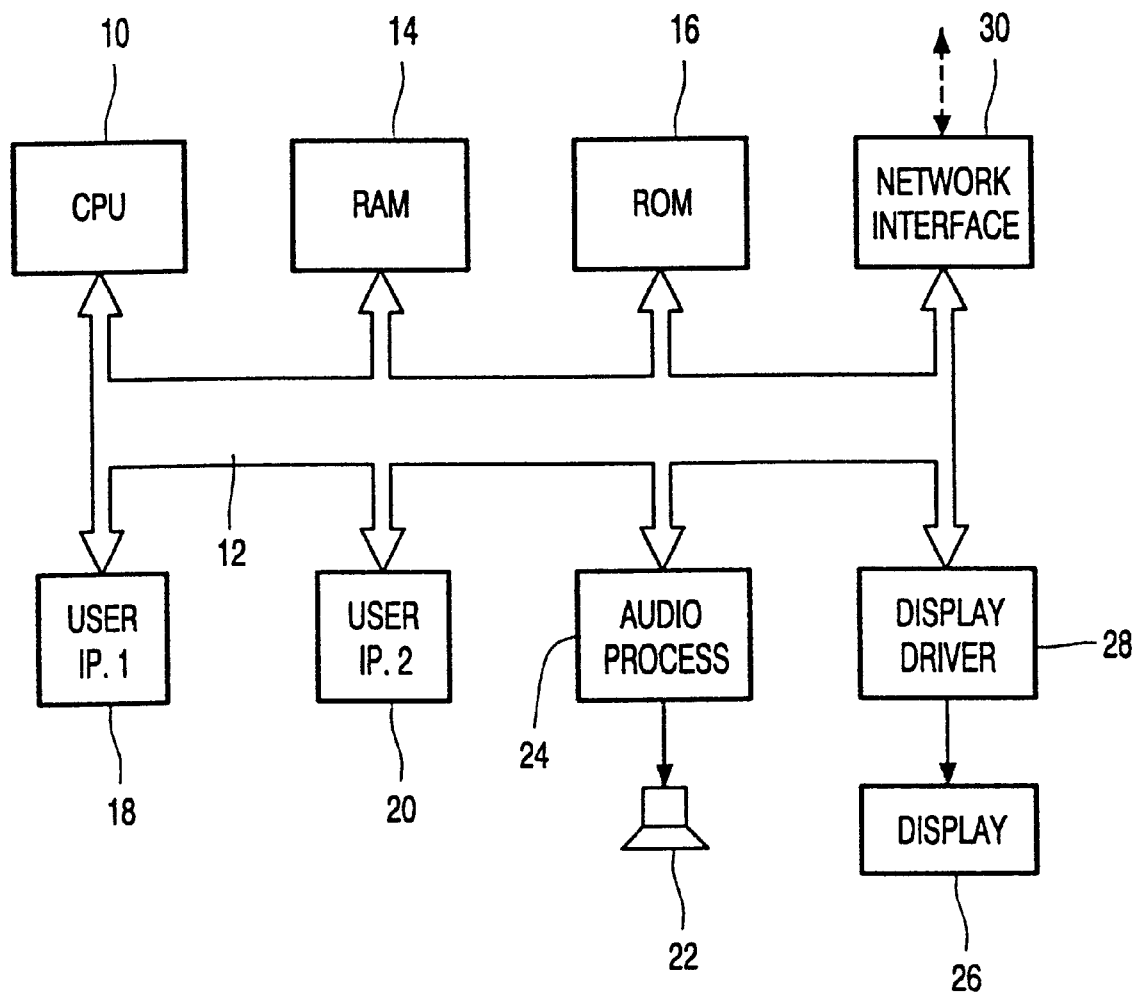
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 (referred to herein as the heap memory) under control of the CPU 10; a controlling program for this may initially be held in ROM 16 and loaded up with the operating system on power-up. The following examples are compliant with memory management techniques in the Java (® Sun Microsystems Inc) virtual machine and the terminology should be construed accordingly: it will be recognised however that the present invention is not restricted to Java-compliant systems, nor to purely virtual memory management.

Figure 2:
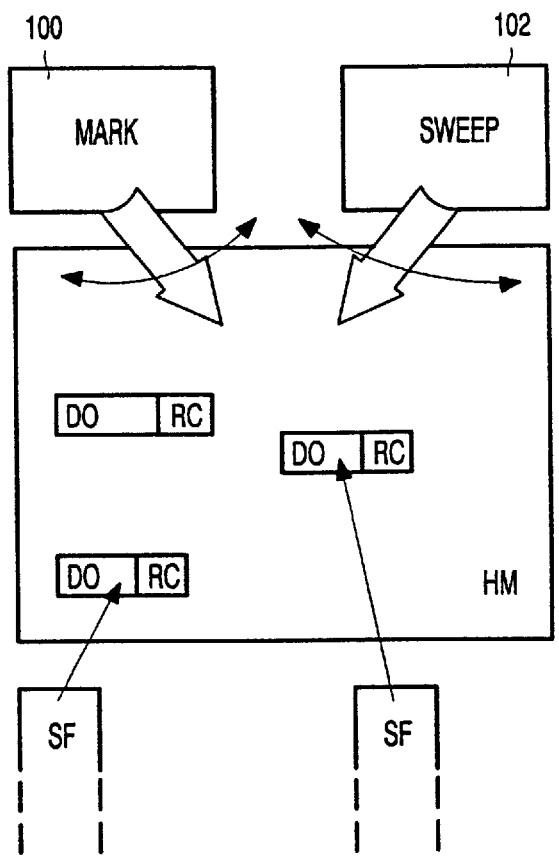
FIG. 2 represents an area of contiguous heap memory with garbage collection through mark and sweep utilities.

FIG. 2 schematically represents a number of discrete memory areas from the system of FIG. 1, in particular a heap memory (HM) holding a large number of data objects (DO) for use by various programme routines or threads, these routines or threads access the data objects by pointers from global or per-thread stack frames (SF), as shown. Each data object (DO) has an associated marking and reference count (RC) portion identifying the number of other data objects carrying references thereto, as will be described, together with a mark state indicator.

In the arrangement shown, it is the heap memory (HM) for which garbage collection is performed: mark utility 100 traverses the heap (HM) identifying, for each data object (DO), the number of pointers from other objects, and sets the reference count value in RC accordingly. The sweep utility 102 also traverses the heap memory HM, but instead it deletes those data objects (DO) that are unreferenced by any other source (i.e. those for which RC=O). In conventional systems, the sweep utility 102 only operates to remove data objects when the mark utility 100 has cleared the heap memory (HM) (i.e. set reference counts for all reachable data objects).

In accordance with the present invention, the two utilities 100, 102 run concurrently, but the reference count (RC) system uses separate fields to the mark state, which mark state may employ the known black/grey/white scheme to indicate whether an object has been reached by the mark process and all its pointers considered (black); whether it has been reached but one or more pointers have yet to be fully checked (grey) or whether it has not been located (white). A further colour (known as off-white) is specified for such schemes and indicates an object which, for whatever reason, is available for deletion and follows as a natural progression from white marking for those objects which, even after a full mark traversal, remain unlocated - for example, if there were no external pointers thereto.

Figure 3:
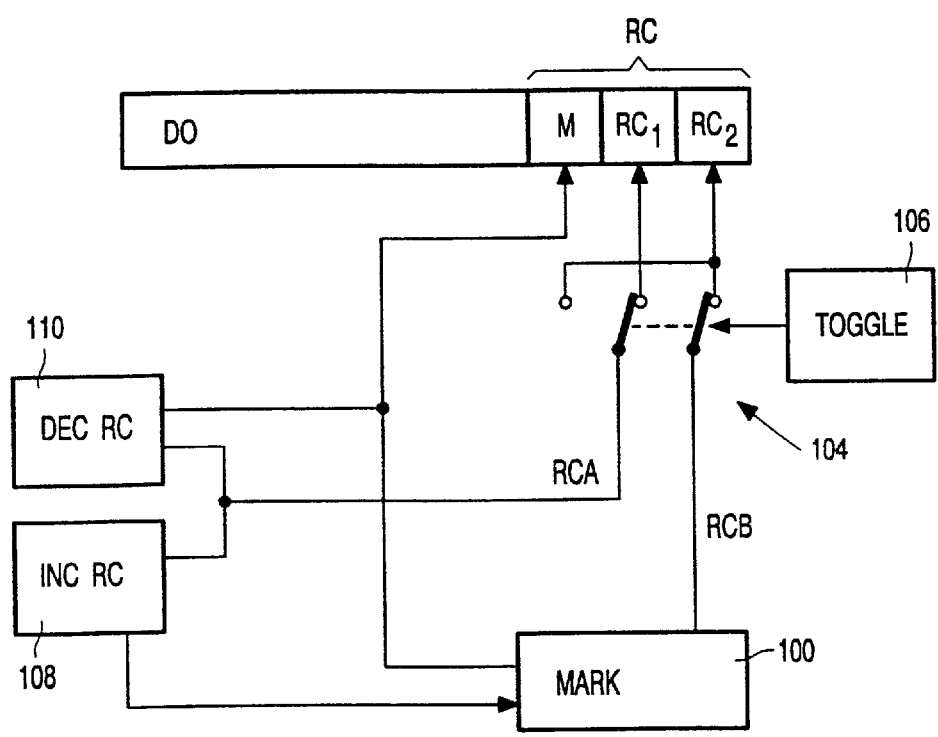
FIG. 3 schematically illustrates the change over operation for mapping between two reference count fields of a data object.

To support concurrent operation, as schematically illustrated in FIG. 3, there are two limited size reference count ($RC_1$, $RC_2$) fields per object, together with a mark state field (M). The count fields $RC_1$, and $RC_2$ may each be as little as two bits, allowing reference counts of 0–3, although in practise, with a reference count of zero triggering deletion and being indicated by the (off-white) state of the mark field M, the two bits could more usefully indicate counts in the range of 1–4. One system count (RCA) identifies the state for the last completed mark cycle, and the other (RCB) identifies the count being built up by the current mark cycle. The two counts RCA, RCB are stored in respective ones $RC_1$, $RC_2$ of the object reference fields, but are swapped at the end of each marking cycle, so that the final state of RCB, as stored in $RC_2$ is considered as RCA for the next cycle. Rather than physically moving this data, the preferred method is to alternate the mapping of the two counts RCA and RCB onto $RC_1$ and $RC_2$ with a swap in the mapping every cycle. As illustrated by FIG. 3, this alteration is provided by physical or logical changeover switch 104 respectively alternating which fields $RC_1$ and $RC_2$ the counts RCA and RCB are read into with the toggling of switch 104 being triggered at the end of a cycle (from 106) by the conclusion of both mark and sweep utilities heap traversal.

The mark state indicator field M is set by mark utility 100 when the mark state for an object transitions from white to grey through the mark traversal process, at the same time as which the field RCB is set to 1. This avoids the need to physically reset all RCB fields at the start of each mark cycle, whilst still avoiding inadvertent locking of an object if the previous count had reached (and stuck at) the maximum value. On all subsequent occasions that the object is found by the mark utility 100, the RCB is incremented. If at any point the reference count is incremented by the setting of a new reference to the data object DO, increment stage 108 coupled with mark utility 100 increments the stored value for RCA and the mark indicator M is set, subsequently causing RCB to be updated. If at any point the reference count is decremented by the removal of an existing reference to the data object DO, decrement stage 110 coupled with mark utility 100 (either directly or, as shown, via the increment stage 108) decrements the stored value for RCA and the mark indicator M is unset.

At any given time, the overall reference count RC can be said to be one (the object is uniquely referenced) if both RCA is set to one and either RCB is one or the mark state is white. Reference counts of zero are reflected in the mark state being off-white although, with an off-white mark state, the actual values in RCA and RCB do not matter. These conditions summarise to:

| | |
|---|---|
| M = off-white | RC = 0 (delete) |
| RCA = 1 AND M = white | RC = 1 |
| RCA = 1 AND M = (grey or black) AND RCB = 1 | RC = 1 |
| RCA = n (n > 1) | RC = n |

Although defined principally in terms of a software browser implementation, the skilled reader will be well aware than many of the above-described functional features could equally well be implemented in hardware or a combination of hardware and software.

From reading the present disclosure, other modifications will be apparent to persons skilled in the art, for example the number of bits available in each of $RC_1$ and $RC_2$ fields may be increased to accommodate higher reference counts. Furthermore, the number of past reference counts held may be increased from just one (as represented by RCA) with the stored values being finally overwritten in strict order: such an arrangement may be contemplated where mark times are very long compared to sweeping, such that a completed reference count from the end of the previous mark phase is available. Such modifications may involve other features which are already known in the design, manufacture and use of data processing apparatus and devices and component parts thereof and which may be used instead of or in addition to features already described herein.

What is claimed is:

1. A method of garbage collection for use in data processing apparatus wherein the memory contains a plurality of data objects, each said data object being at a respective known location within the memory and being accessed via respective pointers carried by memory stacks, the method comprising periodically traversing the memory to mark, for each object, a count of the number of extant pointers thereto from any source and, on detection that an object's count has reached zero, deleting that object;

characterised in that the operations of marking and of deleting objects proceed concurrently and, for each object, separate counts are maintained during a traversal of the number of pointers detected during the ongoing mark traversal and the total number of pointers detected during the previous mark traversal, wherein an object is not deleted if either count holds a non-zero value.

2. A method as claimed in claim 1, wherein each data object maintains a pair of fields into one of which the number of pointers detected during the ongoing mark traversal is written and into the other of which the total number of pointers detected during the previous mark traversal is written.

3. A method as claimed in claim 2, wherein the mapping of values for the number of pointers detected during the ongoing mark traversal is alternated between fields following each traversal.

4. A method as claimed in claim 1, wherein each object further maintains a mark state indicator identifying, for that data object, whether it has been checked during mark traversal and, if so, whether any pointers to the object have been detected.

5. A method as claimed in claim 4, wherein the mark state indicator may alternatively indicate whether the data object is available for deletion by a sweep utility periodically traversing the memory, such an indication overriding the effects of any count value settings.

6. A method as claimed in claim 1, wherein detection at any time of the establishment of a new pointer to an object causes the separate count for pointers detected during the previous mark traversal to be increased by one.

7. A method as claimed in claim 1, wherein detection at any time of the removal of an existing pointer to an object causes the separate count for pointers detected during a previous mark traversal to be reduced by one, and the object to be marked available for deletion if said separate count drops to zero.

8. A data processing apparatus comprising a processor coupled with a random access memory containing a plurality of stored data objects, each said data object being at a respective known location within the memory and being accessed via respective pointers carried by memory stacks, the processor being configured to periodically sweep the memory and to mark in memory, for each object, a count of the number of extant pointers thereto from any source, and to detect when an object's count has reached zero, and delete that object;

characterized in that the processor is configured to implement the operations of marking and deleting objects concurrently and, for each object, to maintain in respective storage areas separate sweep counts of the number of pointers detected during the ongoing sweep and the total number of pointers detected during the previous sweep, wherein an object's sweep count is taken by the processor as zero when both present and preceding sweep counts are zero.

9. Apparatus as claimed in claim 8, wherein the processor's writing of values for the number of pointers detected during the ongoing sweep is alternated between the respective storage areas following each sweep.

10. A medium readable by a data processing device and embodying code for causing performance of the following operations on a data processing device:

maintaining, within at least one memory, embodiments of data structures comprising:
a plurality of data objects, each said data object being at a respective known location within the memory;
at least one memory stack comprising a plurality of pointers for pointing to respective ones of the data objects;
for each object, a first respective separate count of a number of pointers detected as pointing to that object during an ongoing mark traversal;
for each object, a second respective separate count of a number of pointers detected as pointing to that object during a previous mark traversal;
effecting a sequence of mark traversals, each mark traversal comprising: traversing the at least one memory to create values for the first and second respective counts; upon detection that an object's first and second respective counts have reached zero, deleting that object, the deleting operation proceeding concurrently with at least one of the sequence of mark traversals.

11. The medium of claim 10, wherein, within each object, the first and second respective separate counts are maintained as a respective pair of fields.

12. The medium of claim 11, wherein the operations further comprise, following each mark traversal, alternating mapping of values for the number of pointers detected during the ongoing mark traversal between fields within each respective pair of fields.

13. The medium of claim 12, wherein the operations further comprise, for each object, further maintaining a mark state indicator identifying, for that data object, whether it has been checked during mark traversal and, if so, whether any pointers to the object have been detected.

14. The medium of claim 13, wherein the mark state indicator may alternatively indicate whether the data object is available for deletion by a sweep utility periodically traversing the memory, such an indication overriding the effects of any values of the first and second respective counts.

15. The medium of claim 10, wherein the operations further comprise, upon detection at any time of establishment of a new pointer to an object, causing one of the first or second respective counts to be increased by 1.

16. The medium of claim 10, wherein the operations further comprise, upon detection at any time of the removal of an existing pointer to an object, causing one of the first or second respective counts to be decreased by one, and marking the object available for deletion if the first and second respective counts drop to 0 as a result of the causing operation.

* * * * *